US005632584A

United States Patent [19]
Acevedo

[11] Patent Number: 5,632,584
[45] Date of Patent: May 27, 1997

[54] BLIND SNAP MOUNTED CLIP FASTENER

[76] Inventor: Martin Acevedo, 77 Warrenr Rd., Ashland, Mass. 01721

[21] Appl. No.: 628,846

[22] Filed: Apr. 5, 1996

[51] Int. Cl.⁶ .............................. F16B 19/00; F16B 37/04
[52] U.S. Cl. .............................. 411/182; 411/508; 411/913
[58] Field of Search .............................. 411/111, 112, 182, 411/508, 509, 510, 913

[56] References Cited

U.S. PATENT DOCUMENTS

| | | | |
|---|---|---|---|
| 2,643,839 | 6/1953 | Sislik | 411/913 X |
| 3,221,572 | 12/1965 | Swick | 411/508 X |
| 3,373,789 | 3/1968 | Parkin et al. | 411/112 |
| 3,505,922 | 4/1970 | Tinnerman | 411/182 X |
| 4,923,347 | 5/1990 | Moryl et al. | 411/182 |

*Primary Examiner*—Neill R. Wilson
*Attorney, Agent, or Firm*—Malcolm J. Chisholm, Jr.

[57] ABSTRACT

A blind snap mounted clip fastener for anchoring into a round hole pattern stamped from a single sheet metal piece with a base portion (50) that is substantially flat, from which a cylindrical sleeve (24) is drawn and internally threaded. A pair of locking arms (26a) and (26b) projecting outwardly from the base portion, with an anti-rotate tab (20) projecting outwardly from a locking arm (26a) and bent downwardly and perpendicularly to the locking arm. A pair of spaced apart cylindrical shaped segments (28) projecting outwardly from base portion (50) and bent downwardly generally perpendicular and concentric to the sleeve. Along the vertical surface of each cylinder segment, a locking pawl (22) is sheared, shaped and bent outwardly away from the segment with its top edge placed at a predetermined distance from the top surface of the base portion and concentric to the segment perimeter. The blind snap mounted fastener is simple to manufacture and provided With a multiplicity of features such as: anti-rotate, anti-vibration, self-locking, multiple engaging threads, able to accommodate tolerance accumulation, able to tolerate dimensional variations in mounting panel material thickness and with a prevailing locking torque feature. The fastener can be used and installed by anyone possessing simple home tools, such as a drill.

13 Claims, 2 Drawing Sheets

BLIND SNAP MOUNTED CLIP FASTENER

FIELD OF THE INVENTION

This invention relates to a blind snap mounted clip fastener of the kind used to join two panels or a component and a panel together. Specifically to an improved fastener of the snap mounted variety for anchoring into a round hole pattern.

BACKGROUND-DESCRIPTION OF PRIOR ART

The clip fasteners are used in the automobile industry to attach and assemble moldings, trim pieces and other components to panels and other such members. In the electronic and communications industry, the clip fasteners are used to assemble and attach electronic chassis assemblies to support structures, such as equipment racks and cabinets.

The fasteners are formed with retaining tabs which are sheared and formed from side legs, so when the fastener legs are inserted in a work piece opening, the tabs resiliently engage the edges of the opening to retain the fastener in place. A screw extending through a second work piece is turned down through an aperture in the fastener to mechanically join the two work pieces. Such fasteners are described for example, in U.S. Pat. Nos. 4,595,325 and 3,795,890. Another example of the use of retaining tabs sheared and formed from side legs is described in U.S. Pat. No. 3,645,311.

The clip fasteners of this general type have been intended for securement to relatively rigid work pieces or members made of metal or plastic. In order to prevent the fastener from turning relative to the work piece when torque is applied to the screw used to join the two work pieces, the work piece opening receiving the fastener is made rectangular or given some other irregular shape or the fastener and work piece are provided with abutting shoulders. U.S. Pat. No. 4,798,507 to Olah (1989), Sheet Metal U-nut, is an example of a fastener abutting the work piece. The U-nut clips into an opening in the work piece spaced at a specific distance from the edge. The edge of the work piece abuts the U-nut hinge surface and prevents the U-nut from turning. U.S. Pat. No. 4,595,325 to Moran (1984) is a fastener of the general type requiring a rectangular opening on the work piece to prevent the fastener from turning relative to the work piece when torque is applied to the screw used to join the two work pieces.

Fasteners of the general type requiring to be installed in a rectangular opening on the work piece are limited in their scope of application and use. The rectangular opening is usually of a unique shape that requires the use of a special sheet metal punch and die-set to form it. In a high volume production environment it is very undesirable to use rectangular shaped metal punches because the sharp corners wear out quickly and therefore the opening produced fails to meet its dimensional specifications. The parts produced are rejected and production is suspended while the die-sets are replaced. Another unfavorable factor is the high levels of stress concentration at the sharp corners of the opening, which under a vibration environment cause the sheet metal to fatigue and crack open, causing the strength of the joint to weaken and the fastener to lose its grip on the work piece. The same mode of failure occurs on a rectangular opening in a plastic panel. On an automobile, exposed to weather and the elements, the cracked sheet metal corrodes and the integrity of the of the entire automobile is deteriorated.

U.S. Pat. No. 5,176,482 to Reinl (1993) discloses a mounting assembly for motor vehicles. It discloses a sheet metal nut held in a restricted and readily movable manner on the body sheet of an automobile, by two rectangular mounting openings and adjacent lateral beads. The construction is to insure that considerable tolerance accumulation between the position of the openings on the body sheet, the position of the fastener and the position of the component opening can be accommodated. The operation of the fastener requires a unique and complex preparation of the body sheet with two rectangular openings plus two special shape beads formed on the body sheet. The rectangular openings accommodates some amount of tolerance accumulation in vertical direction and in a horizontal direction, but if the opening were made round with a diameter equal to the diagonal distance between the corners of the rectangular opening, the round opening would accommodate a larger tolerance accumulation by allowing the fastener to move all-around in a diametrical manner.

U.S. Pat. No. 4,300,865 to Murray (1981) discloses a blind clip fastener for anchoring into a round hole. An object of the invention was to provide a fastener of this type particularly suitable for securement to members or panels made of relatively of soft material such as sheet molded fiberglass compounds. The fastener resists turning when seated in a round hole by driving its sharp edges into the soft material. This is a fastener intended for a limited application, as described in its disclosure. It can not be used on sheet metal panels or hard plastic parts because it would turn under the torque applied to a screw. The fastener is also intended to be used to support light pieces, such as trims and moldings, because it only has a single thread helix formed on its head. Multiple threads are formed or tapped on fasteners which are required to withstand the higher torque values applied to screws supporting large panels and components.

A snap-in Teenut® fastener manufactured by American Engineered Components, Inc., Cambridge, Mass. is a fastener with tabs or pawls sheared and formed from side legs in a similar manner as described in U.S. Pat. No. 3,645,311 and with a sleeve drawn from its top portion and threaded internally. The Teenut® is designed to snap into a rectangular hole to prevent it from turning relative to the work piece; it is not provided with anti-vibration features to grip and adjust to variations in material thickness; it is not provided with features to accommodate accumulation of tolerances; it is not provided with a feature to induce a locking torque on the threads and to prevent the engaged screw from turning loose.

All the fasteners known suffer from a number of disadvantages:

a) The single formed screw thread on the head of many fasteners limits the amount of torque the fastener can withstand and the amount of holding force it can applied to the work piece. The capacity of the holding screw is also limited by the single formed screw thread on the head of the fastener.

b) The need of a rectangular opening or an irregular shape opening to prevent the fastener from turning is a structural integrity issue and a product reliability issue. The need of a special punch and die-set for fabrication of the work piece is a manufacturing issue and concern.

c) The U-nut type of fastener is limited by its need to be installed abutting the edge of a panel. It can not easily be installed inside an existing panel. The Reinl's fastener is a U-nut type fastener mounted inside a panel in a complex set of rectangular openings and formed or embossed beads.

d) The clip fasteners are restricted in their use by only large manufacturing facilities who have access to the machine tools and the punches used to form the special shape openings required for their installation. The general public can not use these fasteners simply because the tools required for their installation are not readily available and easy to use.

The need exists for a low cost, blind snap mounted clip fastener for anchoring into a round hole, that is simple to manufacture, that is easy to use, that is provided with a simple feature that prevents it from rotating relative to the work piece and in combination with other features, such as prevailing torque, self-locking and multiple engaging threads. The need exist for a fastener of this general type be available to the general public and anyone who possesses simple home tools, such as a drill can install and use to satisfy a personal need.

SUMMARY OF THE INVENTION

Accordingly, several advantages of my invention are:

a) to provide an improved blind snap mounted clip fastener.

b) to provide a clip fastener for anchoring into a round hole.

c) to provide such a fastener which resists turning when seated in a round hole by means of a simple feature that prevents it from turning relative to the work piece.

d) to provide a fastener of this general type which is easy to install by anyone with simple home tools.

e) to provide a fastener with a combination self-locking and anti-vibration feature.

f) to provide a fastener which is suitable for securement to members made of sheet metal or molded plastic.

g) to provide a blind clip fastener which can tolerate dimensional variations in the thickness of the panel in which it is seated.

h) to provide a blind clip fastener which can accommodate considerable tolerance accumulation between the position of the fastener, work piece and the position of the opening on the component to be secured.

i) to provide a fastener able to provide and withstand established industry standard torque values for threaded fasteners.

j) to provide a blind clip fastener which is relatively easy and inexpensive to manufacture.

Further objects and advantages of my invention are to provide a threaded fastener which can be installed easily and conveniently after an automobile frame or an electronic housing assembly is constructed and given the final painting or plating finish. An advantage of my invention is that it can be snap-mounted inside any space where a human hand can fit. Still further objects and advantages will become apparent from a consideration of the ensuing description and drawings.

BRIEF DESCRIPTION OF THE DRAWINGS

In the drawings, closely related figures have the same number but different alphabetic suffixes.

DESCRIPTION OF THE PREFERRED EMBODIMENTS

Figure 4:
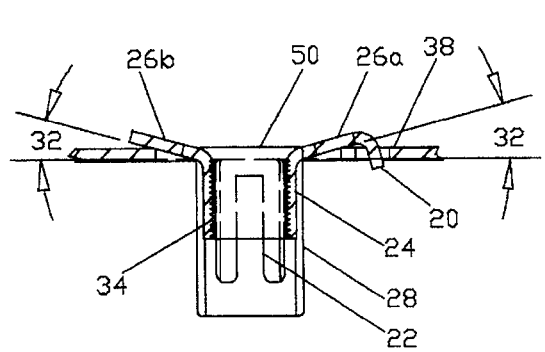
FIG. 4 is a side elevation and cross-section taken along lines 4—4 of FIG. 3, showing the fastener inserted into a work piece.

FIG. 1 shows an embodiment 10 of the fastener of my invention. Fastener 10 has a base portion 50 that is substantially flat and from which sleeve 24 is drawn. The sleeve may have a first generally conical portion and a second generally cylindrical portion as shown in FIG. 4. The sleeve 24 contains a plurality of threads 34. The threads may be machined, tapped or rolled-tapped.

Figure 5:
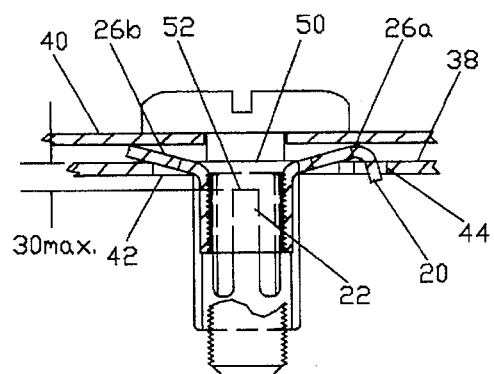
FIG. 5 is a side elevation and cross-section taken along lines 5—5 of FIG. 3, showing the fastener inserted into a work piece.
Figure 6:
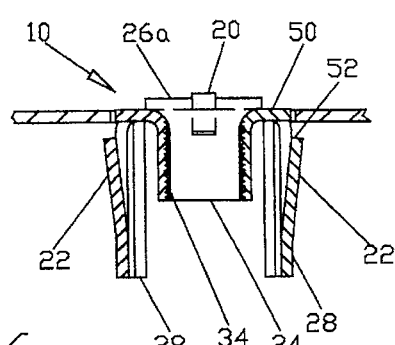
FIG. 6 is the same side elevation and cross-section taken along lines 6—6 of FIG. 3 illustrating a work piece and a component work piece to be connected and assembled by the blind fastener, according to my invention.

A pair of cylinder shaped segments 28 opposed spaced-apart within a diameter D1 concentric to sleeve 24 and bent down generally perpendicular to base portion 50. A bend relief cut 48 facilitate the bending and the forming of cylinder segments 28. Along the center vertical surface of each cylinder segment 28, a locking pawl 22 is sheared and shaped, and bent outwardly away from sleeve 24. FIG. 5 shows a grip range 30 max., the distance between the top edge 52 of locking pawl 22 and the top surface of work piece 38. The panel or work piece 38 is gripped and secured within grip range 30 by the top edge 52 and the underside surface of locking arm 26a and 26b.

Figure 1A:
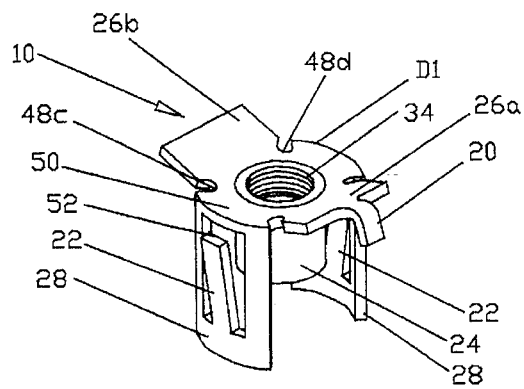
FIG. 1A and FIG. 1B show the preferred embodiment of the fastener according to my invention in perspective left side and right side views.
Figure 1B:
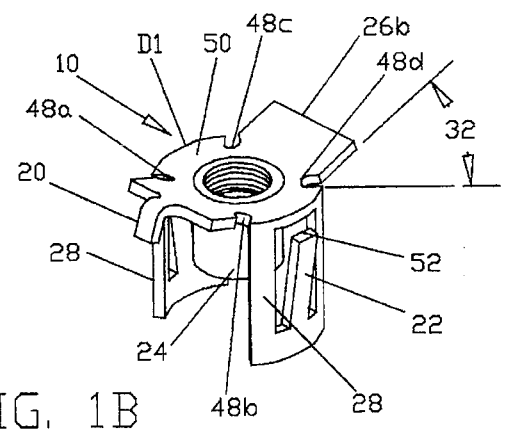

FIGS. 1A, 1B and FIG. 4 show a pair of wings or locking arms 26a and 26b projecting outwardly from base 50 and bent upwardly to an angle 32, approximately along a line between bend relief 48a and 48b and between bend relief 48c and 48d. An anti-rotate tab 20 extends outwardly from the end and center of locking arm 26a and bent downwardly and perpendicular to locking arm 26a.

Figure 2:
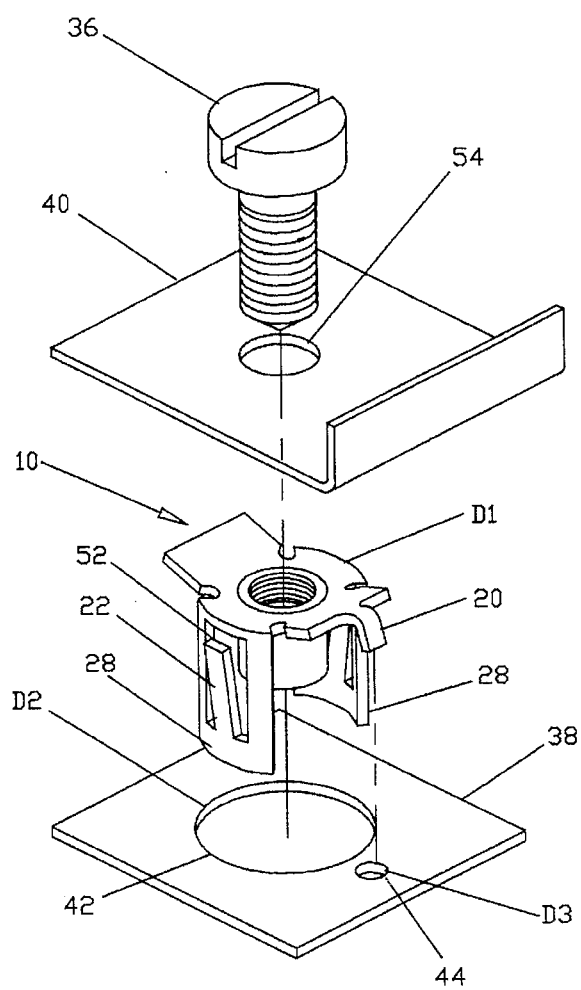
FIG. 2 is a perspective view of an assembly sequence showing a work piece and a component piece as they are to be connected by the blind snap mounted clip fastener.

FIG. 2 shows a panel or work piece 38 with a mounting aperture 42 of diameter D2 and an anti-rotate aperture 44 of diameter D3. Component work piece 40 with an aperture 54. A screw 36, which is inserted through aperture 54 and threaded into sleeve 24. The outline shown of screw 36 is generic and not representative of any specific screw type.

FIG. 2 shows panel or work piece 38 with a mounting aperture 42 of diameter D2 and an anti-rotate aperture 44 of diameter D3. Diameter D2 of aperture 42 is sized larger than diameter D1, which comprises the outline and periphery of cylinder segment 28, and diameter D3 of aperture 44 also sized larger than the width and breath of anti-rotate tab 20. This construction allows a considerable tolerance accumulation and misalignment between the position of the openings on a work piece, the position of the fasteners and the position of the openings on a component with a multiple and complex location of mounting apertures.

The blind snap mounted clip fastener of my invention is stamped from a single sheet metal piece having a relatively small area so that a minimum amount of material is required to make it. Once the fastener has been stamped from a single piece of sheet metal, and the locking arms 26b and 26a with an anti-rotate tab, and the cylinder segment 28 with the locking pawls 22 sheared and shaped, and the sleeve 24 drawn, the threads may be tapped in the sleeve either before or after the fastener is bent into the shape shown in FIGS. 1A and 1B. The threads 34 inside the sleeve are formed by a roll-tapping process with a tap of a shape conforming to the screw type used. Such a tool roll-taps threads in the inner surface of the sleeve collar.

Although the fastener of my invention may be made from suitable resilient metallic or plastic material, it has been found particularly advantageous to manufacture the fastener of the invention from type 1050 steel and heat treated after the forming operation.

The fastener is inserted into work piece 38 by first aligning the cylinder segments 28 with the work piece aperture 42 and by aligning the anti-rotate tab 20 with aperture 44, then the fastener is guided through and into apertures 42 and 44. Diameter D2 of aperture 42 is properly sized and larger than diameter D1 comprising the outline and periphery of the cylinder segments 28. Diameter 44 is also sized larger than the width and breath of the anti-rotate tab. As the fastener is inserted through the work piece, the locking pawls 22 engage the edge of aperture 42 and resiliently deflect inward. When the underside of locking arms 26a and 26b bottom against the top edge of aperture 42, the pawls clear the aperture and snap back into their unstressed position. The pawls are positioned right at the undersurface of the work piece so that if a force is exerted on the fastener tending to pull it out of its opening, the pawls bite into the undersurface of the part and inhibit such removal. The anti-rotate tab, at the same time, is also positioned in the smaller aperture that prevents the rotation of the fastener in any direction.

It is important to note that this rotative securement of the fastener occurs before a screw is turned down into the threaded portion of the sleeve. Obviously, if such a rotation occurred, it would be practically impossible to tighten the screw into the fastener or to remove it therefrom, particularly when, as is often the case, access can not be obtained to the undersurface of the part in which the fastener is installed in order to grip the fastener. It is also important to note that the fastener is installed in various work pieces and parts without any special tools or equipment resulting in further costs savings, particularly in a production line where it may be installed at any convenient assembly station in combination with other assembly sequences.

The apertures 42 and 44 are sized to hold the fastener in a restricted and readily movable manner. The fastener can move diametrically about the periphery of aperture 42 before a screw is turned down into the threaded portion of the sleeve. The fastener is moved and aligned by the pressure of the tool used to drive the screw. The point of the screw strikes the round edge of the sleeve opening and moves and aligns the fastener relatively to the position of the screw. The screw engages the threads on the sleeve and the assembly is then completed.

Figure 3:
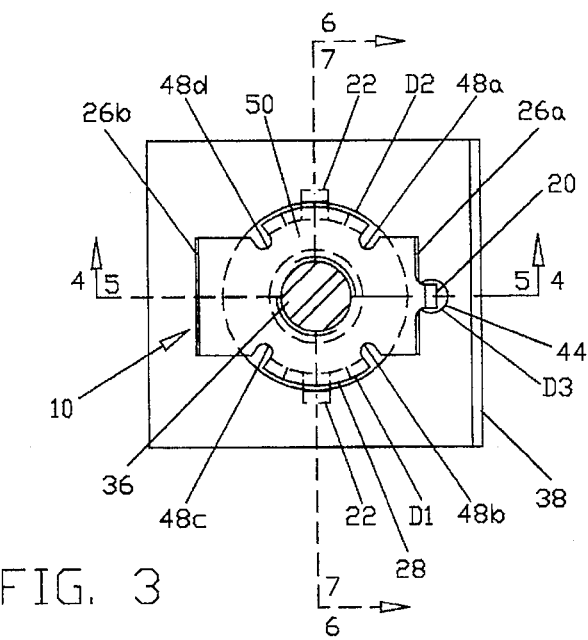
FIG. 3 is top plan view of the fastener inserted into a work piece with the component work piece removed for clarity.
Figure 7:
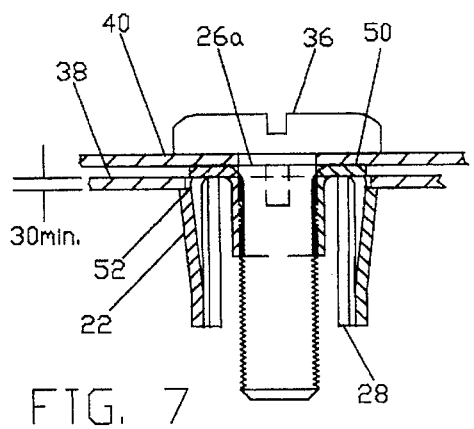
FIG. 7 is the same side elevation and cross-section taken along lines 7—7 of FIG. 3, illustrating a work piece and a component work piece connected and assembled by the blind fastener, according to my invention.

FIGS. 3, 5 and 7 show the assembly process, including the screw and component work piece. The fastener is shown inserted into the work piece. The locking arms 26a and 26b 34 rest on the top edge of work piece aperture 42 and top of base portion 50 is shown lowered into the aperture and is positioned approximately at the same elevation as the top surface of work piece 38. In this position, the fastener grip range 30, the distance between the top surface of the work piece 38 and the top edge of pawl 22 is at its maximum, 30 max. This is a feature of my invention that allows for wide variations in the material thickness of the work piece. As the screw is threaded into the sleeve applies a vertical upward force on the sleeve and it causes the top base portion of the fastener to rise up until the top edge 52 of pawl 22 stops against the undersurface of the work piece, meanwhile the locking arms are deflected by the vertical force into a horizontal position between the two work pieces, as shown on FIG. 7. In this position, grip range 30 is at its minimum, 30 min., equal to the material thickness of work piece 38.

The anti-vibration feature of my invention results when the tensile force developed by the torque applied to the screw acts as a locking form between the undersurface of the work piece and the top edge 52 of pawl 22. The sharp edge on the pawl bites into the work piece and prevents the assembled pieces from rattling and loosening under a vibration environment.

The resilient locking arms 26a and 26b bent at angle 32 are the self locking feature of my invention. The arms perform the same function a common split lock washer would perform in an assembly comprising of a screw, nut, flat washer and a split lock washer. FIG. 5 shows the assembly sequence where the screw has been inserted through the component work piece and partially threaded into the fastener, the undersurface of component work piece 40 has made contact with the top surface of locking arms 26a and 26b and the top edge 52 of locking pawl 22 has made contact with the undersurface of work piece 38. As the screw continues to be threaded into the fastener, the undersurface of the component work piece 40 applies a vertical downward force on the top edge of the locking arms and resiliently deflect the locking arms to a horizontal position between work pieces 38 and 40 as shown in FIG. 7. The locking arms in their deflected and horizontal position apply a constant tensile force on the screw threads. The tensile force is resisted and opposed by the internal sleeve threads, resulting into an induced locking torque that prevents the screw from turning freely.

Thus the reader that the fastener of my invention provides a new and improved blind snap mounted clip fastener with a multiplicity of features, yet economical and easily used and installed by anyone with simple home tools.

The embodiment introduces a new fastener that is easily inserted into a round hole and is provided with a simple feature that prevents it from turning relative to the work piece.

The fastener is also provided with locking pawls positioned at the underside of the work piece, so that if a pull-out force is exerted on the fastener, the pawls bite into the underside of the work piece and inhibit such a removal.

The fastener has a self-locking feature. The opposing force exerted by the locking arms on the underside of a component work piece and the action of the retaining screw on the sleeve threads induce a locking torque on the engaged threads that prevent the screw from turning loose.

The anti-vibration feature of the fastener is provided by a combined action of the locking arms, the screw and the locking pawls. The axial force applied by the screw on the sleeve deflects the locking arms, causes the sleeve to rise and the pawls to grip the underside of the workpiece. This same action accommodates dimensional variations in thickness of the work piece panel. As the action of the screw pulls the sleeve body up against the underside of the component work piece, the pawls also move and rise to meet and grip the underside of the workpiece.

The fastener accommodates considerable tolerance accumulation or misalignment between the fastener, fastener work piece and component work piece. The round hole in which the fastener is inserted is made much larger in diameter than the diameter of the fastener cylindrical segments. The fastener floats or moves diametrically within its anchoring hole.

The fastener is stamped, sheared and formed from a single sheet metal piece of relatively small area.

The fastener is suitable for securement to work members made of metal or plastic.

While my above description contains many specifities, these should not be construed as limitations on the scope of the invention, but rather as an exemplification of one preferred embodiment thereof. Many variations are possible. For example, for some applications the multi-threaded sleeve may not be necessary and a single thread helix may be stamped in its instead on the base portion of the fastener; the locking arms may be shaped in many different forms and positioned in many different manners; the bend relief cuts are not necessary under different manufacturing and configuration options; the cylinder segments and locking pawls may be of many different forms, such as resilient arms turned downwardly from opposite edges of the base portion in a spaced-apart relationship thence extending outwardly away from each other and upwardly to a position below the base portion and concentric to the sleeve; the cylinder segments can be turned inwardly sufficiently to enable the threaded member to be received from the sleeve therebetween and induce a prevailing torque by the force applied against the threads; the sleeve can be drawn upwardly as a stud from the base portion with threads formed externally; the color and exterior finish of the fastener depends on the expected use and environmental exposure.

Accordingly, the scope of the invention should be determined not by the embodiment illustrated, but the appended claims and their legal equivalents.

I claim:

1. A blind snap mounted clip fastener for inserting into a mounting aperture and an anti-rotate aperture of a work piece to secure a component work piece to the fastener, said fastener comprising:

a base portion having a generally cylindrical sleeve drawn and formed therefrom for receiving a threaded member;

a plurality of threads formed in the interior of said sleeve;

a plurality of mirror image cylinder segments integral with and extending downwardly generally perpendicular to the base portion and parallel and within a diameter that is concentric to said sleeve;

a locking pawl extending respectively from each of said segments outwardly towards a predetermined distance from the base portion and within a diameter concentric to said segments;

a pair of locking arms projecting outwardly from the base portion in a spaced-apart relationship and in a predetermined manner and to a position relative to the base portion;

an anti-rotate tab extending from one of said locking arms, downwardly and generally perpendicular and at a predetermined distance from said sleeve axial center, the anti-rotate tab being dimensioned to extend into the anti-rotate aperture of the workpiece whenever the cylinder segments of the fastener are inserted into the mounting aperture of the workpiece so that the anti-rotate tab and anti-rotate aperture cooperate to prevent rotation of the fastener when a rotational force is applied to the threaded member in securing the component workpiece to the fastener.

2. The fastener of claim 1, wherein a locking pawl is sheared and shaped from said segments and bent outwardly away from said segment and upwardly towards a predetermined distance from the base portion and within a diameter concentric to said segments.

3. The fastener of claim 1, wherein the pair of locking arms are angularly bent away from the base portion to a predetermined distance.

4. The fastener of claim 1, wherein a plurality of threads are rolled-formed in the interior of said sleeve.

5. A blind snap mounted clip fastener for inserting into a mounting aperture and an anti-rotate aperture of a work piece to secure a component work piece to the fastener, said fastener comprising:

a. a base portion defining a generally cylindrical sleeve for receiving a securing member;

b. a cylinder-shaped segment integral with and extending generally downwardly and perpendicular to the base portion;

c. a locking arm projecting outwardly from the base portion; and, d. an anti-rotate tab extending from the locking arm downwardly and generally perpendicular to the base portion, the anti-rotate tab being dimensioned to extend into the anti-rotate aperture of the workpiece whenever the cylinder-shaped segment of the fastener is inserted into the mounting aperture of the workpiece so that the anti-rotate tab and anti-rotate aperture cooperate to prevent rotation of the fastener when a rotational force is applied to the securing member in securing the component workpiece to the fastener.

6. The fastener of claim 5, wherein the securing member is threaded.

7. The fastener of claim 5, wherein the cylinder-shaped segment includes a locking pawl extending from the segment away from the cylindrical sleeve.

8. The fastener of claim 7, wherein a plurality of cylinder-shaped segments are integral with and extend generally downwardly and perpendicular to the base portion.

9. The fastener of claim 5, further comprising a pair of locking arms extending away from the base portion and the anti-rotate tab extends from one of the locking arms.

10. The fastener of claim 9, wherein the pair of locking arms are angularly bent away from the base portion.

11. A blind snap mounted clip fastener for inserting into a mounting aperture and an anti-rotate aperture of a work piece to secure a component work piece to the fastener, said fastener comprising:

a. a base portion defining a sleeve means for receiving a securing member;
  b. a cylinder-shaped segment integral with and extending generally downwardly and perpendicular to the base portion;
  c. a lock pawl means extending from the cylinder-shaped segment for securing the fastener within the mounting aperture;
  d. a locking arm projecting outwardly from the base portion; and,
  e. an anti-rotate tab means extending from the locking arm downwardly and generally perpendicular to the base portion for extending into the anti-rotate aperture of the workpiece whenever the cylinder-shaped segment of the fastener is inserted into the mounting aperture of the workpiece so that the anti-rotate tab means and anti-rotate aperture cooperate to prevent rotation of the fastener when a rotational force is applied to the securing member in securing the component workpiece to the fastener.

12. The fastener of claim 11, wherein a plurality of cylinder-shaped segments are integral with and extend generally downwardly and perpendicular to the base portion.

13. The fastener of claim 11, further comprising a plurality of locking arms extending away from the base portion and the anti-rotate tab extends from one of the plurality of locking arms.

\* \* \* \* \*